United States Patent [19]
Kallstrom

[11] Patent Number: 6,068,276
[45] Date of Patent: May 30, 2000

[54] PNEUMATIC TRAILER SYSTEM

[76] Inventor: Ervin C. Kallstrom, 55 W. Hoover, Suite 11, Mesa, Ariz. 85210

[21] Appl. No.: 08/872,204

[22] Filed: Jun. 10, 1997

Related U.S. Application Data

[60] Provisional application No. 60/019,783, Jun. 14, 1996.

[51] Int. Cl.$^7$ .................................................. B60G 11/26
[52] U.S. Cl. .............................. 280/124.157; 280/6.151; 280/124.177
[58] Field of Search ........................... 280/6.151, 6.152, 280/124.157, 124.177, 789, 656, 43.18, 43.23, 124.16, 754, 755

[56] References Cited

U.S. PATENT DOCUMENTS

| | | | |
|---|---|---|---|
| 2,957,593 | 10/1960 | Evans | 280/789 |
| 4,032,167 | 6/1977 | Chereda | 280/789 |
| 4,170,279 | 10/1979 | Pelletier | 188/300 |
| 4,415,181 | 11/1983 | McCall | 280/789 |
| 5,348,333 | 9/1994 | Gee | 280/491.5 |
| 5,413,374 | 5/1995 | Pierce | 280/713 |
| 5,443,283 | 8/1995 | Hawkins | 280/709 |
| 5,474,416 | 12/1995 | Rogge | 419/482 |

FOREIGN PATENT DOCUMENTS

| 2187149 | 9/1987 | United Kingdom | 280/754 |
|---|---|---|---|

*Primary Examiner*—Michael Mar
*Assistant Examiner*—Lynda Jasmin
*Attorney, Agent, or Firm*—Gregory J. Nelson

[57] ABSTRACT

A trailer with a frame having a center load receiving channel for a motorcycle or for a similar load. A pair of oppositely extending wheel supporting axles are pivotally mounted near the center channel.

Bladder-type air cylinders extend between the frame and axles near the outer end of the axles. An air suspension system automatically controls the inflation of the air cylinder during transit and allows the user to selectively deflate the air springs to lower the trailer to a position close to the ground so a load such as a motorcycle can be rolled into the trailer. The user can then operate the system to inflate the air cylinder. Level control valves maintain the air cylinders at the proper position. A fail safe system maintains the trailer in an elevated position in the event of air system failure.

15 Claims, 10 Drawing Sheets

PNEUMATIC TRAILER SYSTEM

This application claims the benefit of U.S. Provisional Application No. 60/019,783 filed on Jun. 14, 1996.

CROSS-REFERENCE TO RELATED APPLICATION

The present application is based on provisional patent application Ser. No. 60/019,783, filed Jun. 14, 1996.

BACKGROUND OF THE INVENTION

Field of the Invention

The present invention relates to a trailer system and more particularly relates to a trailer which has a unique pneumatic suspension system which supports and levels the load and allows the trailer to "kneel" or lower to accommodate loading and unloading items from the trailer.

Trailers for towing such items as motorcycles behind a car, truck or recreational vehicle are well known. The common trailer design consists of a solid axle to which wheels are mounted on opposite ends of the axle. Springs are attached to the axle at the widest location. The forward spring attachment is rigidly secured to an outside frame member for fore-to-aft axle stability and is attached to a rigid frame mount by a flexible spring hanger at the rearward end of the frame member. The spring hanger compensates for the unequal distance aft of the front spring hanger to the axle mount when the spring is compressed. This differential can be lessened by lowering the front spring pivot point but this practice is generally avoided because it is a more complex and costly design and adds axle and deck weight that may offset any advantages gained.

Typically, two longitudinal frame members are joined by load-carrying, transverse frame members upon which is mounted the trailer deck. The deck, by necessity, is located above the axle the distance of the upward wheel travel plus the thickness of the deck and deck frame. It is not uncommon for trailers to have a deck positioned 6" or so above the center of the axle. The entire weight of the load, deck, frame and springs bear on the axle, wheel and the supporting surface.

The conventional towing trailer, due to the requirement that the trailer handle or accommodate the largest load possible, is designed with a suspension spring stiffness designed to support the maximum load. With a trailer designed for a typical load of 2,000 pounds, it is common design practice to use suspension parts that have a load capacity of 3,000 pounds. Trailers utilizing this design have springs which are rigid at very low load levels, as for example 500 pounds, which rigidity effectively negates any load cushioning except for tire compression. As the load increases, the springs come into play and absorb more of the shock imposed by the travel surface. The best ride occurs when the load has caused the springs to flex approximately 50%. At this point, stability has been sacrificed for softness of ride because the loaded springs have lost their ability to rigidly maintain direction of the wheels. This often happens when the wheels pass over a sharp bump in the travel surface.

Upon encountering a bump in the roadway, conventional springs force the wheels to follow the roadway because of the mass of the load. Inertia causes the load to resist changes while the lower mass of the wheels, assisted by the stored energy in the springs, forces the wheels downwardly to contact the roadway. When this happens, the wheels will move rearwardly a slight distance, changing directions slightly due to the different length of the spring. Because the wheels are in contact with the roadway, this slight side way wheel force will load the spring with the energy that it has accumulated. The spring energy will dissipate through the frame mount and will tend to move the load sideways. The side motion is exacerbated upon encountering washboard roads resulting in trailer lateral or side way sway. Even on relatively smooth surfaces, a trailer can experience considerable sway if the load is displaced by any amount by the action of forces such as the wind moving the load relative to the axle.

Some newer trailer designs utilize a rubber tube inserted in a hollow axle with a center torsion bar attached to a crank supporting the wheel spindle. With designs of this type, the only way to obtain additional vertical wheel travel is to extend the length of the spindle crank. If this is done, the wheel spindle at the end of the longer arm can deflect from the forward travel direction upon side thrust loads also leading to sway.

While instability of conventional trailer designs is a problem as outlined above, there are also other problems. Conventional trailers are generally not conveniently storable because of their size and extending draw bar. Also, conventional trailers are often difficult to load or unload because of the elevation of the deck. For example, in some instances, it is difficult if not impossible, for a single individual to unload a heavy item such as a motorcycle from a trailer.

In view of the foregoing, there exists a need for an improved trailer system which is simple, reliable, rugged, stable in transit, safe and offers convenience when loading, unloading and storing.

BRIEF SUMMARY OF THE INVENTION

The trailer of the present invention has a weight center point which is selected to stabilize the vehicle handling and to greatly reduce the potential for handling difficulties, particularly when encountering emergency traffic conditions and rough roads. The trailer frame includes a center channel which is designed to receive and support the widest motorcycle tire in conventional use today. The frame is one-piece construction extending the full length of the trailer and is the load-carrying backbone of the trailer. This design concentrates the maximum weight at the center of the trailer equidistant from each wheel. Extending equidistant from the weight center point are two lateral support members terminating in the wheel area. The top of each of these two vertical frames comprises a steel plate forming a reverse U-shaped channel which provides a support surface for the axle mounts and the suspension load-carrying components.

A pair of axles are provided and each consists of a rigid steel tube that is pivoted near the center of the trailer and mounted in resilient bushing mountings. These bushings provide lateral support as fore-aft bracings for the wheels as well as providing a pivot point for the suspension.

The trailer uses air cylinders or bladders as suspension springs affording optimum suspension stiffness for the load and also providing independent suspension at each wheel. The air cylinders or bladders are connected to a pneumatic air suspension system which provides self-leveling and also allows the operator to selectively vent the bladders to lower the trailer. Automatic leveling for uneven load compensation is provided by leveling valves in the air suspension system. The trailer is automatically leveled to the relative frame/axle height and the system will increase air pressure in the lower cylinder until a proper level is attained. The air suspension system maintains the trailer deck at a consistent height above the roadway. The trailer of the present invention uses the air suspension system to adjust to the weight of the load. The level of the trailer is maintained by the introduction of a volume of air into the air cylinders. Once the desired level has been achieved, no additional air is introduced so the load floats and the ride remains soft.

Because of the geometry and simplicity of the system, the system applies the side thrust of the wheel load to the center of the deck. There are no intermediate mechanical variations that can affect the alignment of the wheels and consequently sway is not induced.

The trailer of the present invention also includes a removable draw bar for ease of storage. The trailer is provided with dual receivers to which the tow bar may be attached for towing and removed for convenient or compact storage.

Another significant advantage of the present invention is that the system allows a person without assistance to load and unload heavy items such as heavy touring motorcycles such as the well-known Honda Goldwing. To lower the trailer, an air control valve is operated to place it in the "down" position which will vent compressed air from the air cylinders to atmosphere allowing the trailer to lower or "kneel" to a position with the end of the center channel only a fraction of an inch above the ground and the deck only a few inches above the surface. The lowered position allows the user to easily load and unload articles and in this position, the user can roll a motorcycle onto or off the trailer. The trailer may also be provided with a filler section which can be removably inserted into the center channel so that a flat or planar deck is provided if required. When the trailer is loaded, the deck is raised by placing the control valve in the "up" position to elevate the trailer.

The invention also includes a fail-safe inhibitor which fail-safe system will maintain the trailer at an elevated position above the roadway surface in the event of a catastrophic failure of the air support system.

BRIEF DESCRIPTION OF THE DRAWINGS

The above and other objects and advantages of the present invention will become more readily apparent from the following detailed description, claims and drawings in which:

DETAILED DESCRIPTION OF THE INVENTION

Trailer Frame and Chassis

Figure 1:
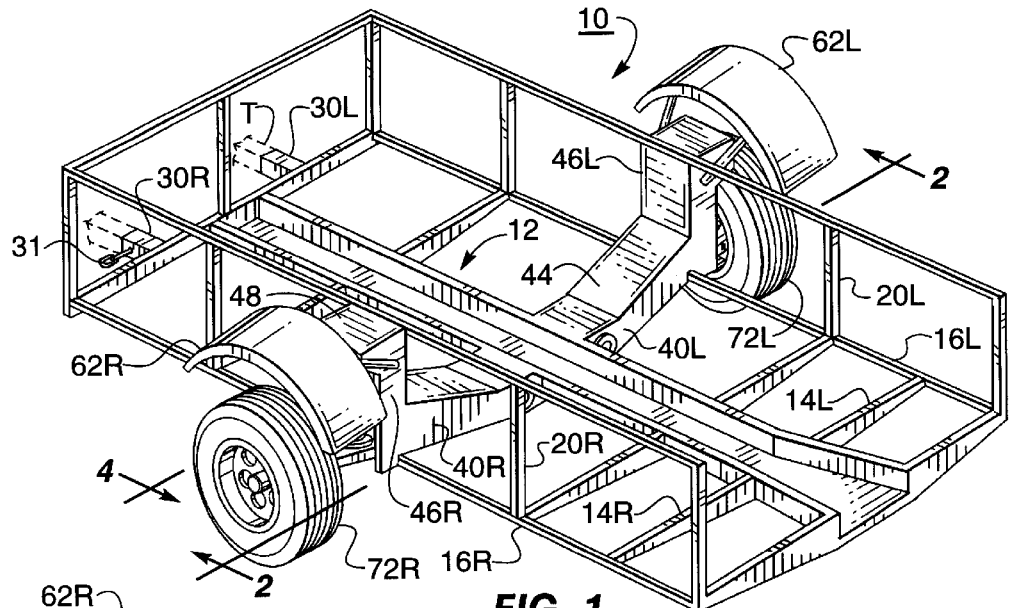
FIG. 1 is a perspective view of the trailer of the present invention with the trailer deck and side walls removed for clarity.
Figure 2:
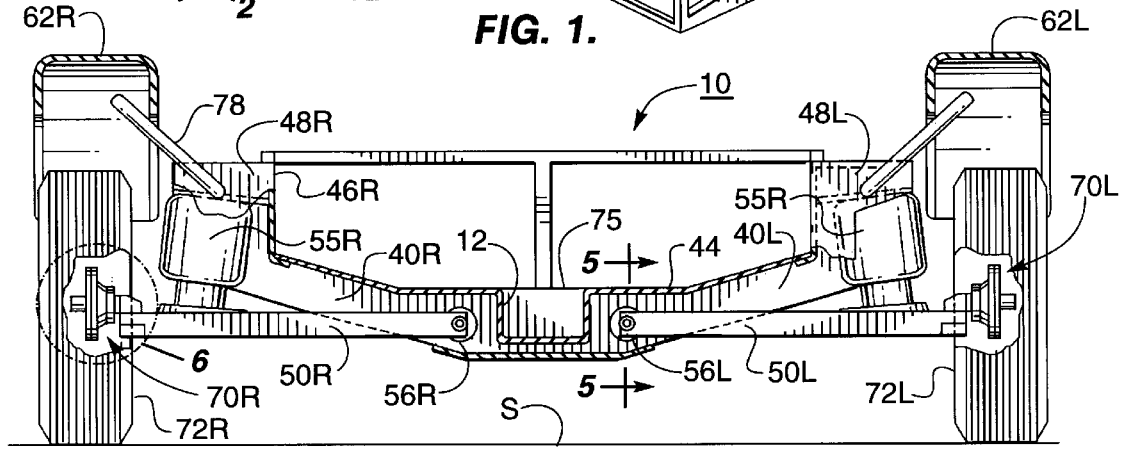
FIG. 2 is a sectional view taken along line 2—2 of FIG. 7.
Figure 3:
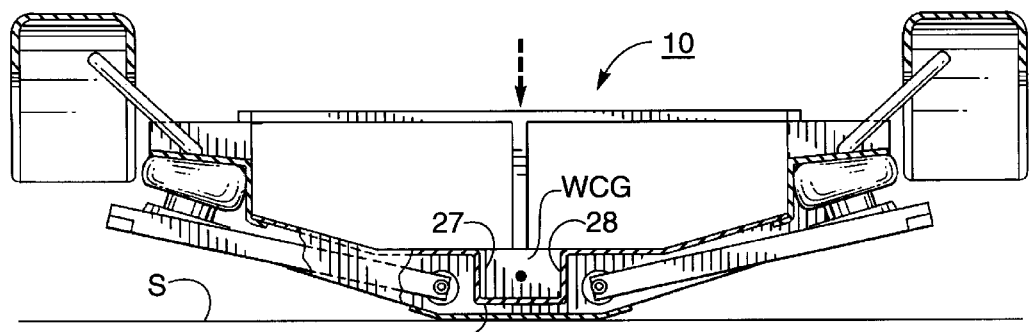
FIG. 3 is a view similar to FIG. 2 showing the trailer in a lowered position.
Figure 4:
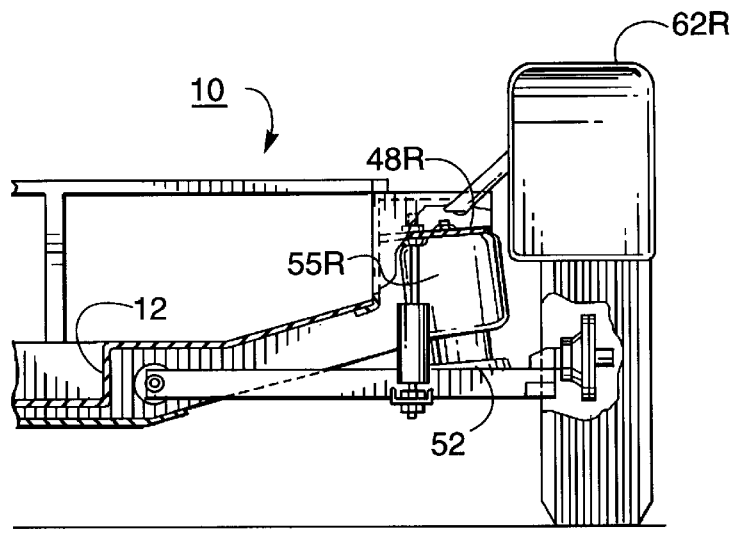
FIG. 4 is a sectional view taken along line 4—4 of FIG. 7 showing one-half of the trailer as viewed from the front.

Turning now to the drawings, particularly FIGS. 1 to 10, the trailer of the present invention is generally designated by the numeral 10 and the design of the trailer is initially based on a determination of the weight centerpoint "WCG" which is selected by determining the intended use for the trailer considering weight, type and size of the intended load. FIG. 3 shows the WCG. The design theory is based on the underlying premise that the tow bar provides directional forces and the tow bar is not intended to carry the trailer load weight. Accordingly, the design philosophy of the present system stabilizes vehicle handling reducing potential for catastrophic handling difficulties in difficult and emergency traffic conditions.

From the WCG outward, a load-carrying frame supports a lighter frame. At the center of the trailer frame is a centered channel 12 which extends longitudinally, substantially the entire length of the trailer. A plurality of outwardly extending, generally triangular lateral braces 14R, 14L, extend and support the relatively light side rails 16L and 16R. The appended letters "R" and "L" refer to the right and left sides of the trailer as viewed from the front of the trailer. A plurality of upright braces 20R, 20L are also be provided supporting upper-peripherally extending rails 22. Side paneling and a top or cover may be supported by the frame, if required by the user, to provide protection of the contents from theft and from the environment.

The center channel 12 has a horizontal bottom 26 and opposite side walls 27 and 28 which side walls may flare outwardly at the rear end of the trailer to accommodate loading as best seen in FIG. 1. The frame is one-piece integral construction extending the full length of the trailer and the channel 12 is the load carrying backbone of the trailer which concentrates maximum weight at the center of the trailer equidistant from the wheels.

Figure 10:
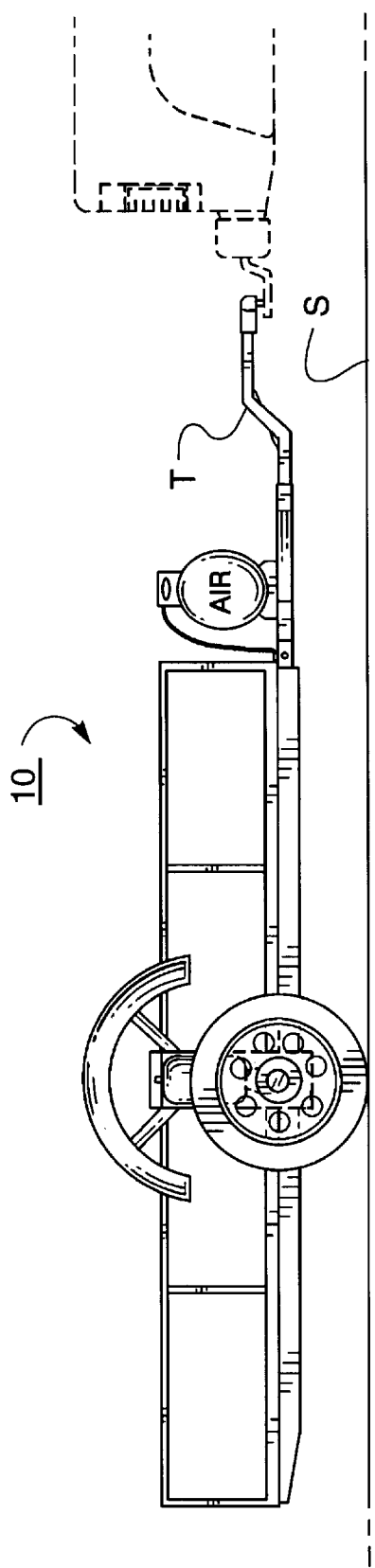
FIGS. 10 and 10A are side views showing the trailer with an attached towing vehicle in the transit and lowered positions, respectively.

A pair of receivers 30R and 30L are secured to the transverse frame member at the forward end of the trailer. The receivers are adapted to receive the ends of a tow bar "T" having parallel arm members. The tow bar is detachably secured in the receivers 30 and 30A by conventional means such as locking pins 31 provided with safety retainers so the pins do not become loose during transit or use. Detachability of the tow bar allows the tow bar to be conveniently removed for more compact storage of the trailer. The tow bar is attached to the ball on the tongue of the towing vehicle. The tow bar T also provides a convenient location for mounting and supporting the air accumulator and compressor which are component parts of the pneumatic system as seen in FIG. 10 and as will be more fully explained hereafter.

Two lateral support members 40R, 40L are located equidistant from the weight center point of the center frame and extend oppositely beneath the deck. The lateral support members are generally U-shaped having a top surface 44 of a material of suitable strength such as 10 gauge steel plate. Each of the support members 40L, 40R terminates at a vertically-extending frame member or extensions 46R, 46L each having an upper mounting plate 48R, 48L which plate is slightly outwardly inclined as seen in FIG. 2.

Figure 5:
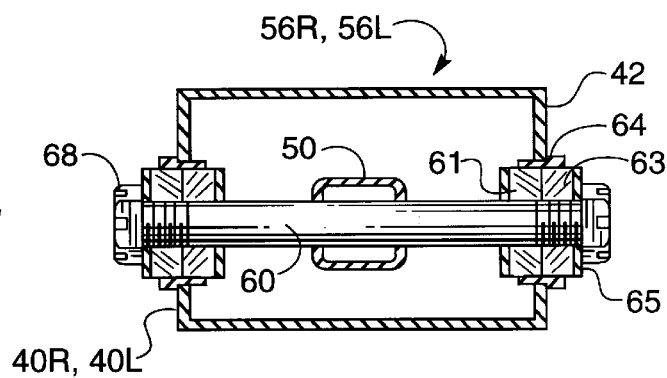
FIG. 5 is a sectional view taken along line 5—5 of FIG. 2 showing the support bushing for the axles.

A pair of axles 50R, 50L, which are shown as rigid steel tubes, are pivotally mounted adjacent the center line of the longitudinally-extending channel 12 in bushing mounts 56R, 56L. Bushing mounts 56R, 56L are best seen in FIG. 5 and each has a pivot rod 60 extending transversely between the side walls 42 of the respective support member 40R, 40L. The opposite side walls of the support member define oversized bores which receive the end of the pivot rod 60. The associated axle is secured to the pivot rod and the opposite ends of the rod are threaded. Resilient bushings 61, 63 are maintained in place by peripheral bushing retainer 64 and washers 65. The pivot rod is retained in place by channel nuts 68 on opposite ends of the pivot rod.

Figure 6:
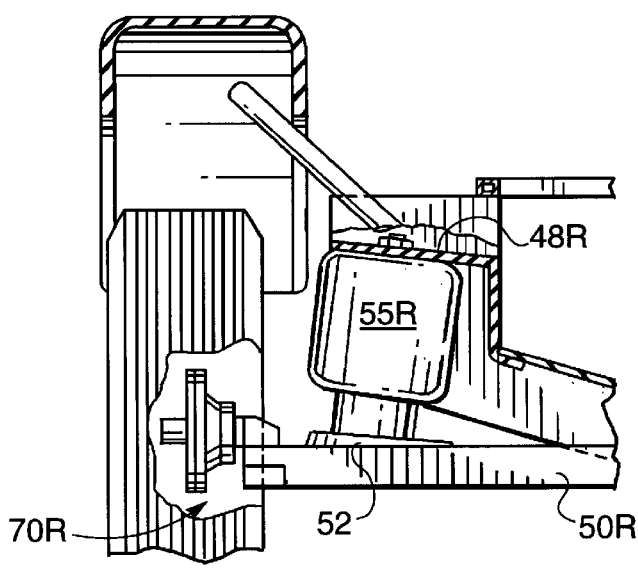
FIG. 6 is an enlarged detail view of the air suspension bladder as indicated by the area circled in FIG. 2.

The outer end of each of the axles 50R, 50L is attached to an air spring or cylinder such as the type manufactured by Air Lift Corporation and designated Part No. 58141. The upper end of each of the air cylinders 55R, 55L engages the associated plate 48R, 48L at the ends of the respective lateral support members 40R, 40L. The bottom of the air cylinders are each supported on ramp 52 on the axles as seen in FIG. 6. The use of air springs as suspension springs affords optimum stiffness of the load. The nuts 68 are tightened sufficiently to compress the resilient bushings to secure a tight yet flexible fit.

Figure 7:
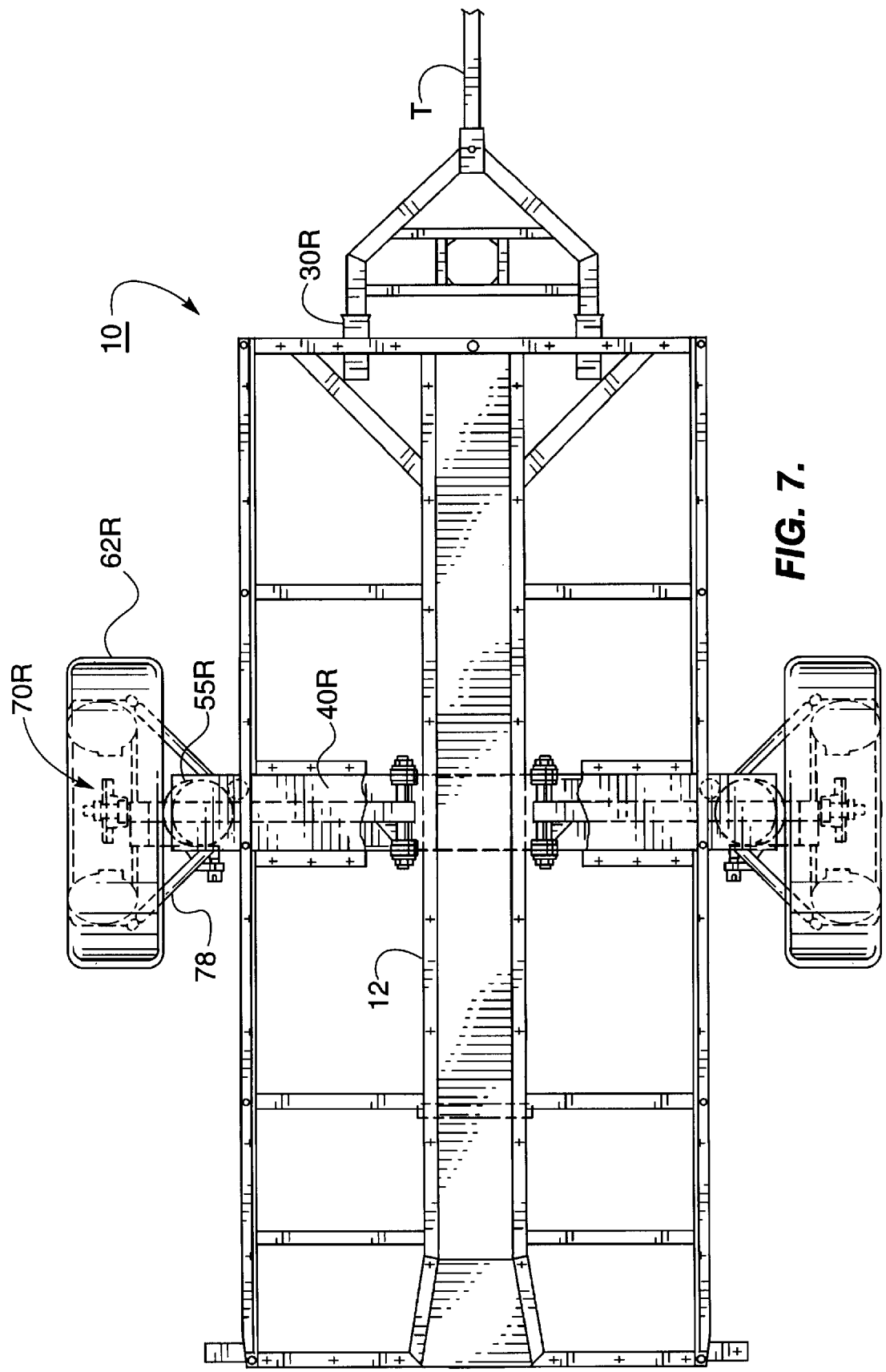
FIG. 7 is a top view of the trailer.

The outer end of each of the axles is attached to and supports a king pin 70R, 70L of conventional design and which, in turn, rotatively supports wheels 72R and 72L. This is best illustrated in FIGS. 2, 6 and 7.

Fenders 62R, 62L may be provided on the trailer both for aesthetic and safety considerations and are shown as being of conventional arcuate configuration. Fenders 62R and 62L are located above the opposite wheels and are held in place by bracket members 78 extending from the outer end of the channels 40R, 40L, respectively.

In FIGS. 2 and 10, the trailer is shown in the normal transit position with the center channel 12 supported above the roadway surface "S". Typically, the load-carrying center channel supports a load such as a heavy touring motorcycle, approximately 8½" above the surface as to provide as low a deck as possible.

Figure 10A:
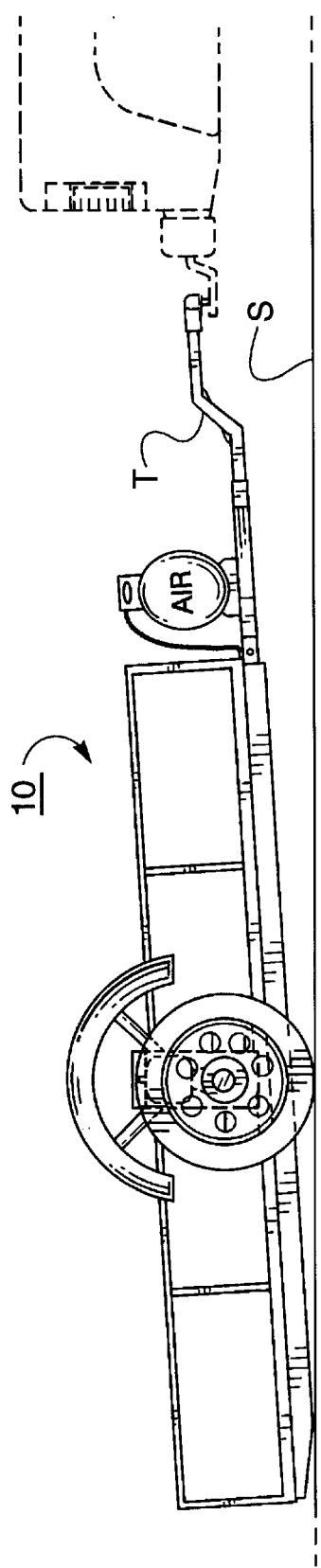

In FIGS. 3 and 10A, the trailer is shown in the loading and unloading or kneeling position in which the bottom surface of the center channel is only slightly above the roadway and the bottom surface of the longitudinal channel 12 is resting on the roadway surface "S". In this position, the load, such as a motorcycle, only needs to be elevated about 3/16" in order to be placed on the trailer.

If the user requires a substantially planar trailer deck surface, a filler 75 such as shown in FIG. 2, may be removably inserted into the center channel 12. The filler 75 is in the form of an elongate box-like structure configured to the dimensions of the center longitudinal channel.

Pneumatic Suspension System

Figure 11:
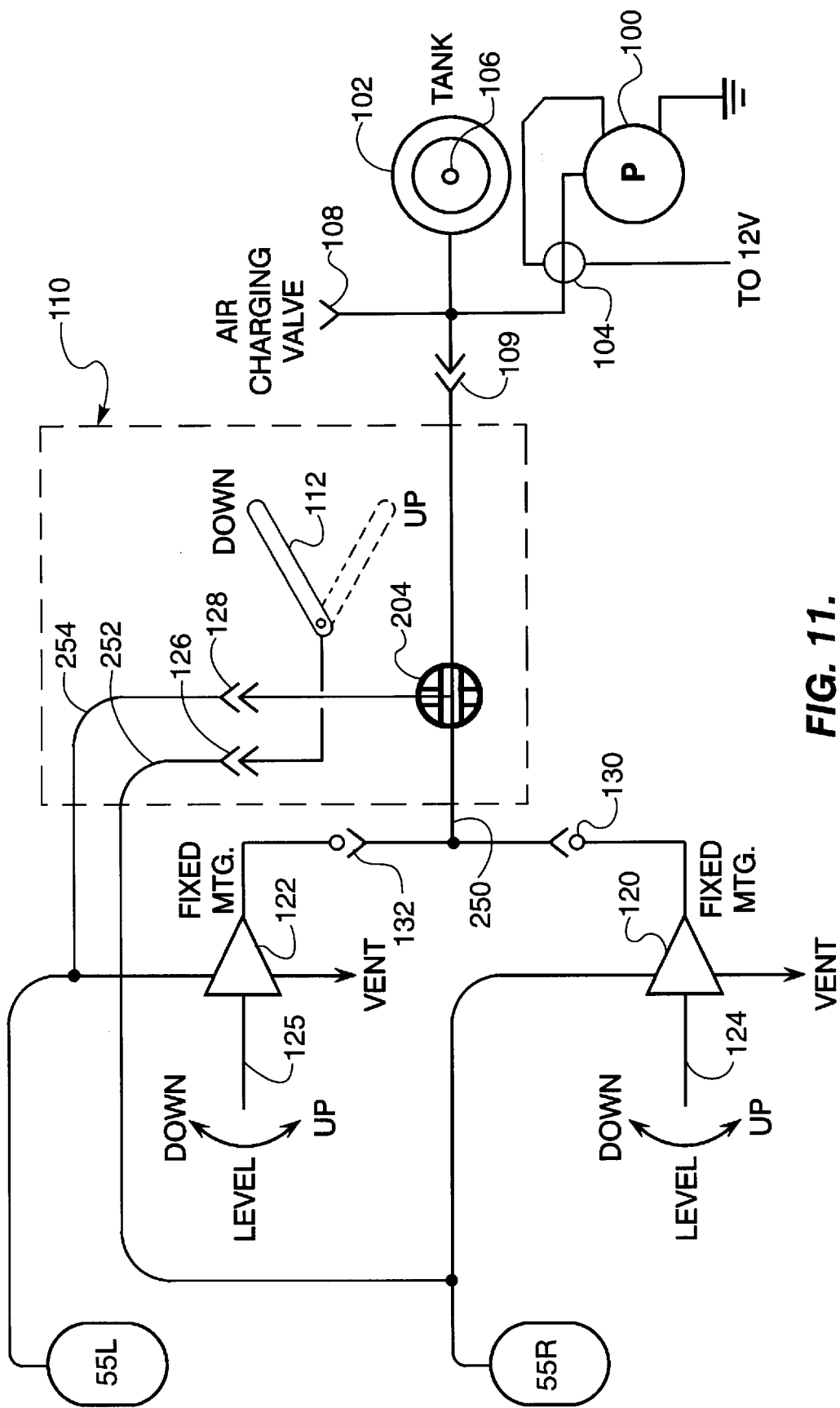
FIG. 11 is a schematic diagram of the pneumatic suspension system.

The pneumatic system for selectively inflating and deflating the air springs or cylinders is schematically shown in FIG. 11 and components are shown in FIGS. 12 to 18. The air cylinders, as explained above, are designated as 55R and 55L and are of the type manufactured by Airlift Corporation.

The system includes an air compressor 100 which may be of any convenient type such as a Hadley 12 volt compressor which may be conveniently mounted exterior of the trailer, such as on the tow bar T. The compressor 100 is preferably wired into the electrical system of the towing vehicle by suitable connectors. The output of the compressor is connected to accumulator tank 102 which also may be mounted on the tow bar. The air compressor off/on control switch 104 is interposed between the compressor and the accumulator and operates to activate the compressor when accumulator pressure falls below a predetermined pressure as, for example, 120 psi and will operate to shut the compressor off when accumulator pressure reaches an upper pressure limit as, for example, 150 psi. A shut off valve 106 is associated with the accumulator 102. A standard Schrader air valve 108 may be connected to the air tank for service station emergency filling.

The air tank is connected to air control valve 110 across quick disconnect 109 so the tow bar T with attached air tank may be removed from the trailer. The air control valve 110 will be more fully described in detail with respect to subsequent drawing FIGS. 12, 13 and 14. Briefly, when the air control valve 110 is operated to the "down" position by means of lever 112, the outlet port will close shutting off air supply valve to level valves 120 at 122 at outlet 250. Air control valve 110 has ports 126 and 128 which are Schrader-type valves. One-way check valves 130 and 132 are interposed between the outlet port 250 and level valves 120 and 122, respectively to prevent backflow if the air source fails.

Figure 17:
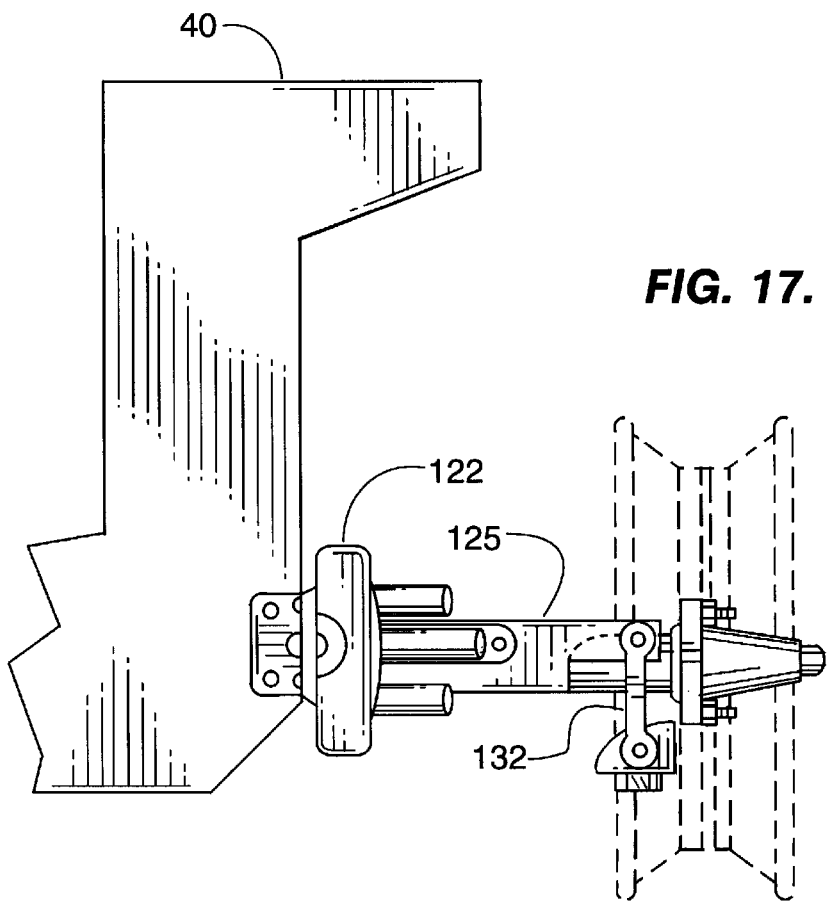
FIG. 17 is a side view showing the mounting of the leveling valve.
Figure 18:
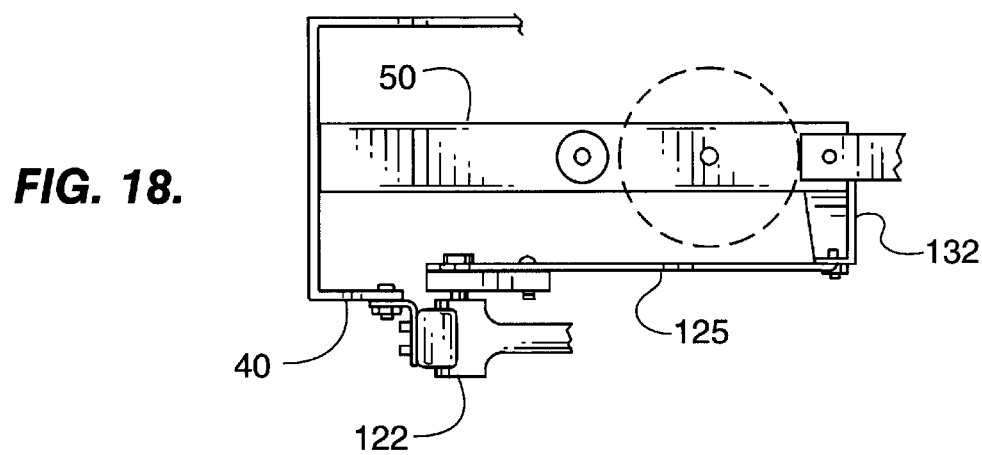
FIG. 18 is a top view showing the mounting of the leveling valve.

A level control lever 125 is associated with the valve 122 and similarly a level control lever 124 is associated with valve 120. FIGS. 17 and 18 show the mounting of valve 122 with respect to the frame. The mounting of valve 120 is essentially the same. The valves 120 and 122 are also vented to atmosphere as indicated in FIG. 11. Air spring or cylinder 55L is connected to the outlet port of valve 122 and is also in communication with Schrader valve 128. Similarly, cylinder 55R is connected to the outlet port of valve 120 and also communicates with Schrader valve 126. Valves 120 and 122 are conventionally available valves such as Neway Suspension Leveler Valves, Part Nos. 90-54-007 which, depending on the position of the associated level control lever which are positioned by the axle acting against link 132, will direct air to "vent" or to the associated air spring or air cylinder, or maintain the valve in a neutral position. FIG. 17 shows the level control valve 122 in the lowered position which will actuate the valve 122 to raise the trailer.

Figure 12:
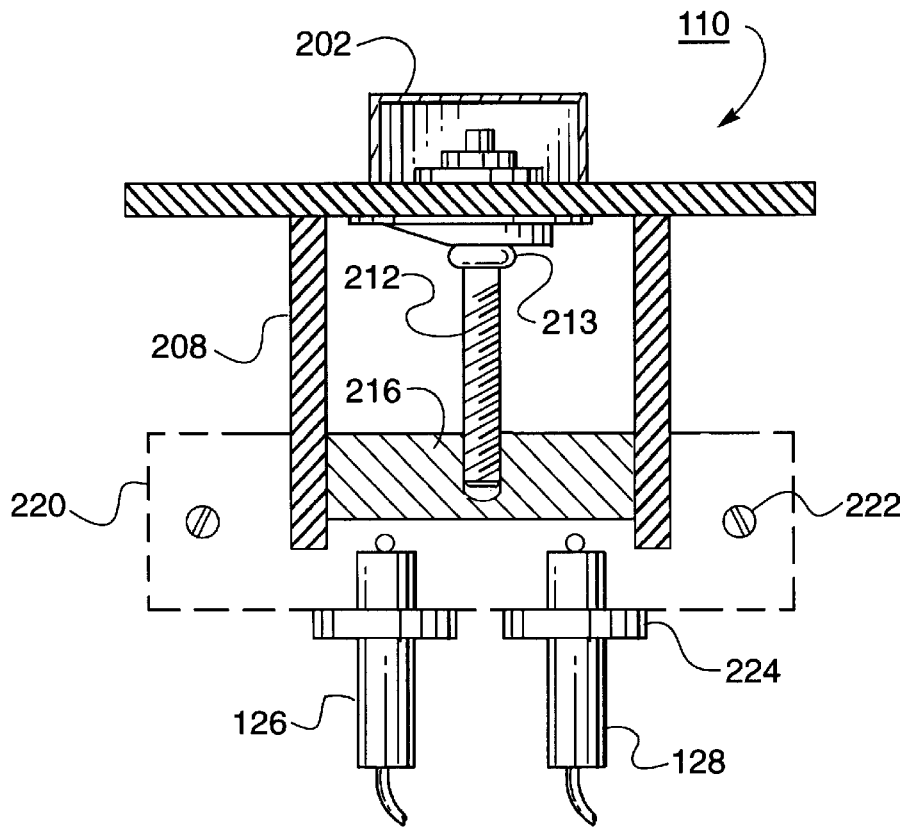
FIGS. 12, 13 and 14 are detail views of the air control valve which is part of the pneumatic suspension system.
Figure 13:
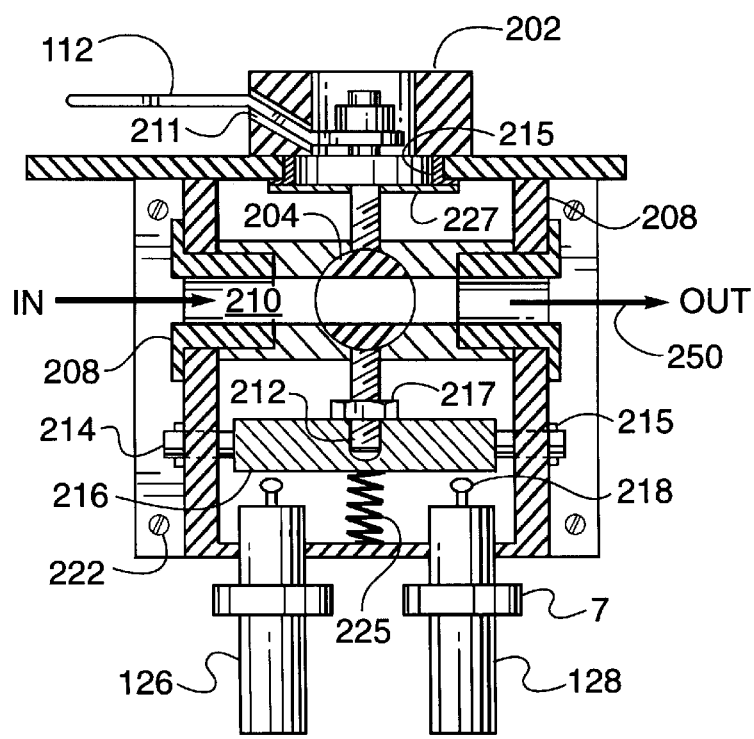
Figure 14:
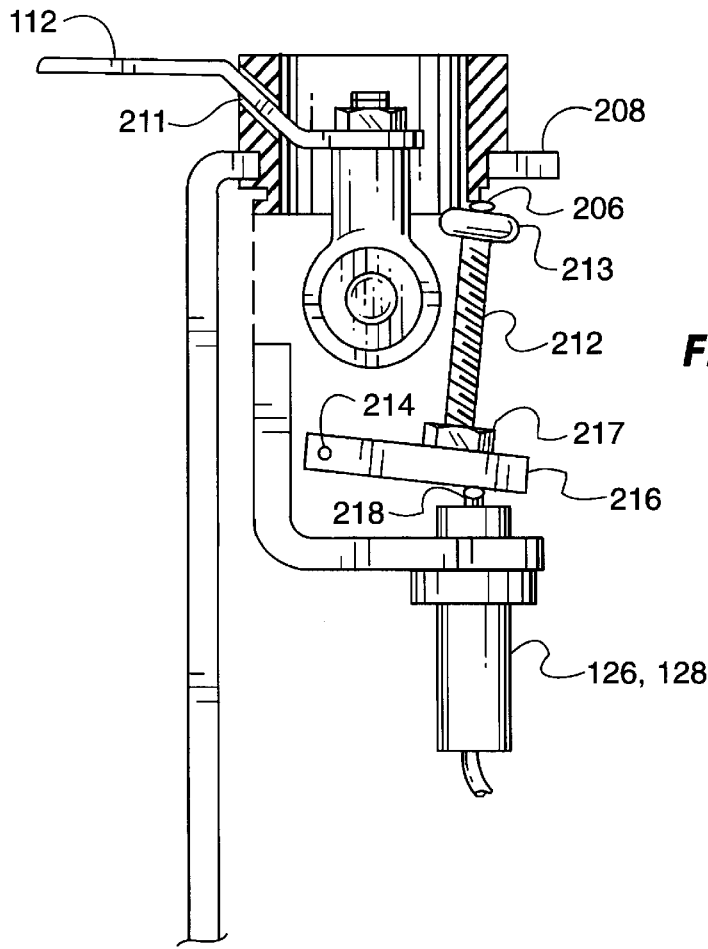

Referring to FIGS. 12 and 13 which show the details of construction, the control valve 110 has an inlet port "IN" and an outlet port 250 within valve body 208. The valve body is mounted on a mounting plate 220 which can be secured to any convenient location. A ball valve 204 intercepts the passageway 210 connecting the inlet and the outlet and is rotatable from an open to a flow-blocking position. FIG. 13 shows the open position. A bore is provided in the housing plate to accept machine cam sleeve 202 retained by the retainer 215. The ball valve lever 112 is inserted in the self-centering relief slot 211 machined in the cam sleeve 202 and the ball valve housing 204 is held in place on the valve side plates 209 by fittings 205. The armature bar 216 is held in place by steel pivot pin 214. The pin 214 is secured between the side plates 209 by clips 215. Attached to the armature bar 216 by means of a tapped hole is screw 212 locked in adjustment by a retainer nut 217. The screw head cam follower 213 is in contact with cam 227 and is adjusted for the proper length. The valve plate accepts mounting screws 222. The threaded housings for Schrader valve 126 and 128 are secured and adjusted by nuts 224. The Schrader valves have stems or release pins 218.

The air supply is connected to the inlet side of the valve 110 and the outlet side is connected to the load at outlet 250 as seen in FIG. 11. In the open position, air passes unrestrictedly through the valve 110 to the load. The valve 110 has cam ramp 206, which is on cam 202, cam follower 213, armature 216, having a cam surface 227. Cam follower 213 is secured on adjusting screw which, at its lower end, carries an armature plate 216. The underside of the armature plate contacts the release pins 218 of the Schrader valves 126 and 128. The pins 218 are maintained out of contact with the armature 216 by the force exerted by return spring 225 and in this position communication with the air lines 252 and 254, shown in FIG. 11, is blocked. In operation, when the lever 112 is moved 90° clockwise, ball valve 204 closes the air passageway 210 between the inlet and the outlet of the valve. The cam sleeve 202 is forced to turn with the ball valve lever through the self-aligning relief slot 211 in the cam sleeve. The machined portion of the cam sleeve, consisting of the cam surface 227 and cam ramp 206, rotates toward the cam sleeve area forcing the cam follower 213 to move away from the sleeve 202. This movement is transmitted by a screw 212 to the armature 216 depressing the armature return spring 225 and the Schrader valve release pins 218 permitting the compressed air within the lines to escape.

To raise the trailer, the valve lever 112 is placed in the "up" position and the ball valve 204 opens supplying air to the inlet ports of the level control valves 120 and 122. The control levers 124 and 125 of the level valves are connected to the axles at links 132 near the wheel spindles and the valve body of valves 120, 122 are attached to the trailer frame as seen in FIGS. 17 and 18. In the lowered position, pressurized air is directed to the common port 250 supplying the level valves 120, 122.

Figure 8:
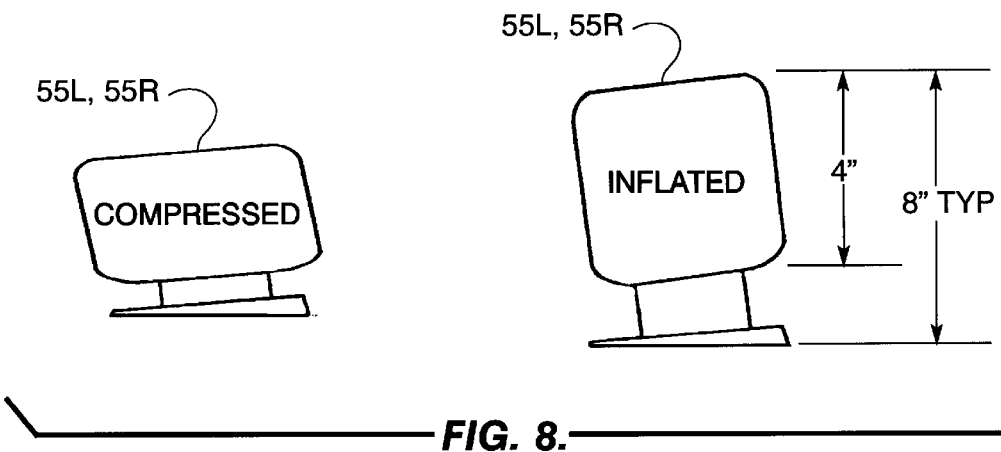
FIG. 8 is a view illustrating one of the air suspension bladders in both a compressed and extended position.
Figure 9:
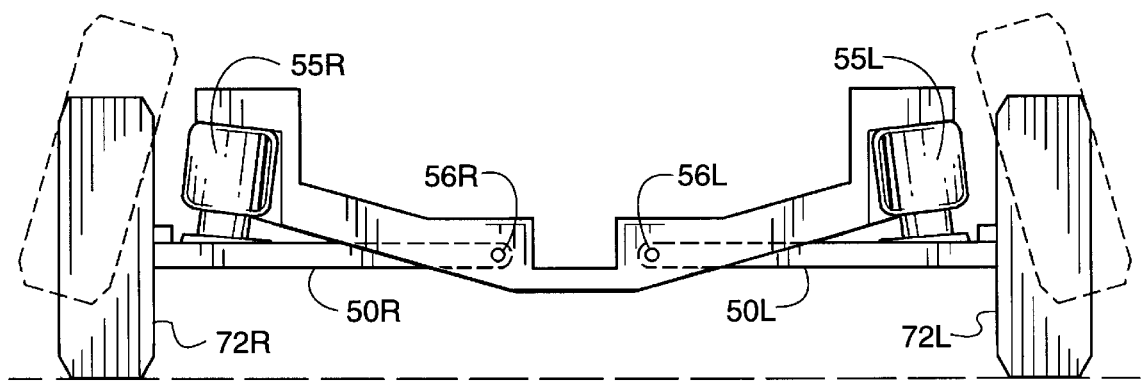
FIG. 9 is a transverse cross-sectional view of the trailer showing the relative position of the trailer in the road position and the lowered or kneeling position in dotted.

In the "up" position of the control valve, lines 252 and 254 are blocked. Compressed air is directed from the level valves to the air cylinders 55R and 55L. The air cylinders are positioned between the moveable axle and the rigid frame. As the length of the stroke of the air cylinders increases due to increased air pressure, the frame is forced upwardly relative to the axle which forces the trailer into an elevated position as seen in FIG. 8. The extending movement of the air cylinders is arrested when the levers 124, 126 are brought into the neutral position.

To lower the trailer, the air control valve 110 is placed in the "down" position. This will close the ball valve 204 shutting off air supply to the level control valves 120, 124 and will open air control valve ports of the Schrader valves, venting compressed air from the air cylinders 55R and 55L to atmosphere. The weight of the frame will force the axles to rotate around the pivot points thus lowering the trailer to its lowered, base line position to facilitate loading and unloading. During travel, the system will also operate to automatically level the trailer using the air suspension system described. The trailer deck is maintained at a consistent elevation above the roadway by the level control valves.

Fail Safe System

Figure 16:
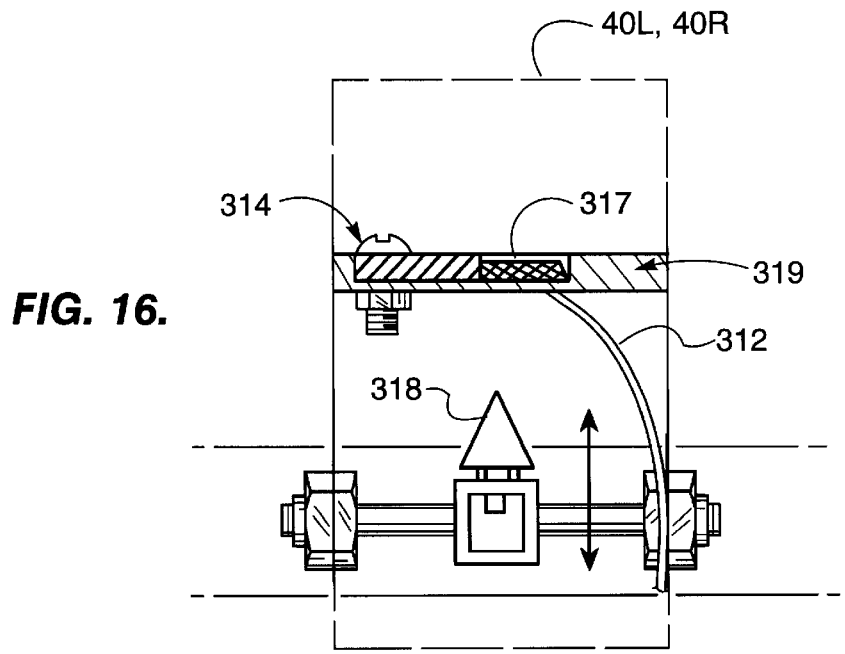
FIGS. 15 and 16 are detail views of the fail-safe system which prevents lowering of the trailer in the event of failure of the pneumatic system.
Figure 15:
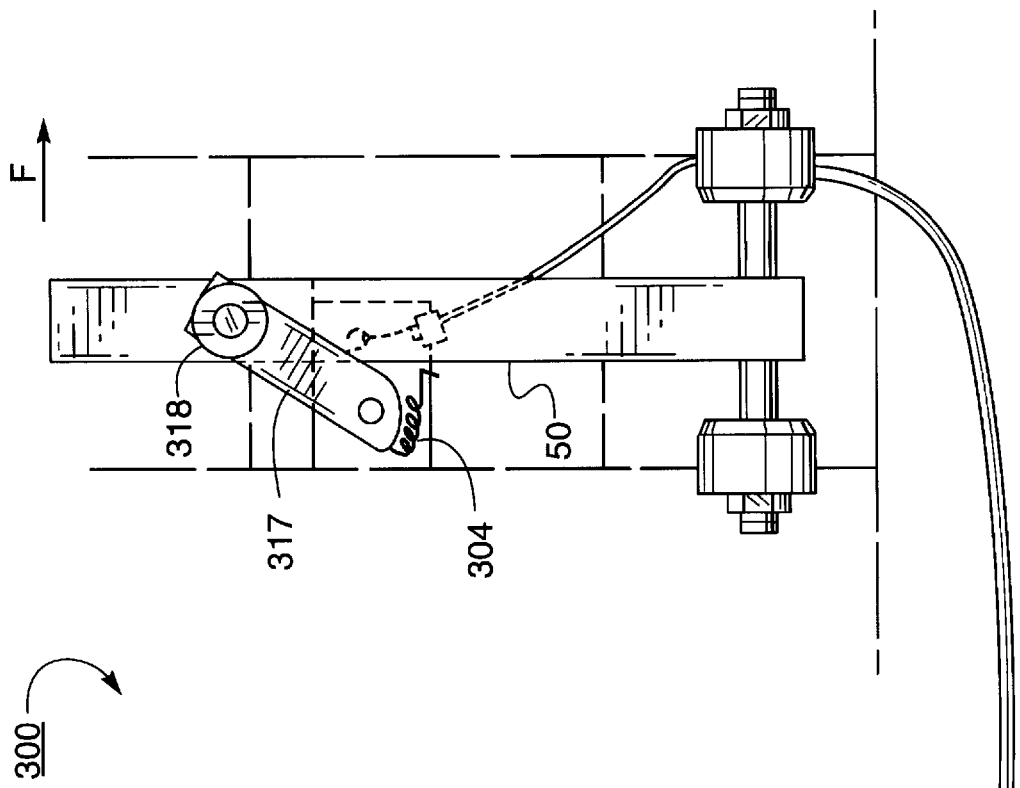
Figure 15:
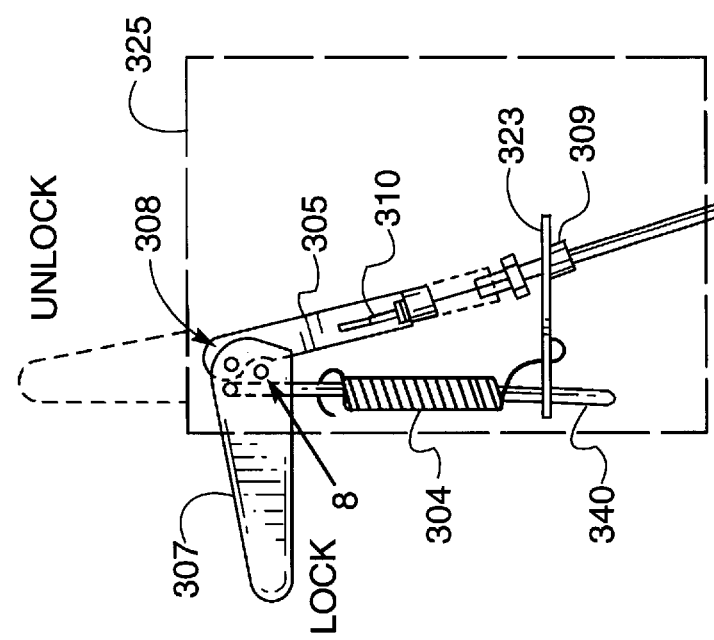

The trailer system also has a fail-safe feature which is termed an "inhibitor" and is shown in FIGS. 15 and 16. The fail-safe system is designed to maintain the trailer in an elevated position above the roadway surfaces in the event of an inadvertent failure of the air system. The fail safe system is associated with both axles 50L, 50R. As seen in FIGS. 15 and 16, the system, which is generally designated by the numeral 300, has a steel pivot blade 317 with a hole drilled in one end to receive return spring 305 which has sufficient tension to return the blade to the rest position shown in FIG. 15. A fail safe device is associated with both axles. The blade 317 is mounted above the axle and is engageable by a bumper 318 of hard rubber or similar material mounted on the axles 50R, 50L. A slot 314 in the frame provides support for the blade 317. A cable 312 is attached to blade 317 and the cable is directed to a control box 325 where the cable is secured by an adjustable stop 309. The control box 325 may be located at any convenient remote location. The end of the cable is secured to a threaded and drilled bolt 310 which is fitted through a hole in a yoke assembly 305 and attached to control lever 307 by a cotter pin. An adjusting nut secures the cable and affords adjustment.

The control lever 307 is attached to the control box 325 by a pivot bolt assembly 308. Stabilizer rod 340 attaches the control lever 307 to provide an over center lock for the control lever. The upper end of the stabilizer rod is held in place by a key. The lower end of the stabilizer rod 340 passes through a hole in the bracket 323 for support. A spring 304 is attached to and surrounds the stabilizer rod and supplies tension between the rod and bracket.

When the control lever 307 is placed in the upright position shown in dotted, the yoke 305 is released in a downward direction, releasing tension on the cable 312. The return spring 305 returns the blade 317 to the unlocked position. The conical rubber bumper 318 is attached to the axle at a position so that it will come into contact with the blade 317 when in the locked position and prevents the trailer from fully lowering. When in the unlocked position, the blade 317 is positioned so it clears the rubber bumper and the axle is free to move upward so that the vehicle may assume a fully lowered position.

From the foregoing, it will be seen that the trailer of the present invention provides a number of significant advantages including a low center of gravity, along with acceptable ride quality. The trailer also provides substantial vertical travel of the wheels, as much as 8". The trailer is supported on air cylinders between the lateral frame extensions and the outer end of the inwardly hinged axle. The lateral frame members, along with the center channel create a load-carrying U-frame which transfers the weight to the upper ends of the air cylinder. When the air cylinders are pressurized, force is applied to the axle and the frame is lifted. Thus, the trailer is supported or floats on a cushion of air. The load carrying center channel supports a load, such as a heavy motorcycle, only a small distance above the ground. The user may use a conventional deck by inserting the filler. The user may also lower the trailer by operating the control valve for easy loading and unloading.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A two-wheeled trailer having a travel and a lowered loading position comprising:

(a) a frame having a width and including:

i. a generally longitudinally extending centrally positioned channel having a width less than the width of the frame;

ii. a lateral support secured to said channel, said lateral support having a main body section and having opposite end sections laterally spaced from said lateral support each end section defining a suspension surface spaced above said main body section;

(b) first and second axles each pivotally connected to said lateral support adjacent and laterally spaced from said longitudinal channel, each axle extending outward to an axle end spaced below said suspension surface of the associated lateral support;

(c) first and second ground-engaging wheel assemblies on the ends of said first and second axles;

(d) an air spring interposed at each of the axle ends extending between the associated axle end and the associated suspension surface of the associated lateral support, each air spring having a deflated position in which said associated axle is angularly inclined;

(e) a pneumatic system for selectively inflating and deflating said air springs to maintain the trailer substantially level during travel and to allow the channel to be lowered for loading and unloading, said pneumatic system including:

i. a source of air supply;

ii. a control valve having a body with an inlet in communication with said air supply and having an outlet;

iii. valve means including operator means for moving said control valve between first and second positions;

iv. an air release valve communicating with each of said air springs and cam means positionable by said operator means to place said air release valves in venting positions when said control valve is moved to said second position;

v. a level control valve for each air spring mounted to the frame, said level control valve having an inlet in communication with the said outlet from said control valve to receive air therefrom when said control valve is in said first position and said level control valve having a first neutral position, a second venting position and a third position for directing air to the associated air spring; and (f) actuator means associated with said level control valve engaging said axle and moveable to selectively position said level control valve in said first, second or third position.

2. The trailer of claim 1 wherein each of said axles are pivotally connected to said lateral support member within resilient bushing members which are in compression.

3. The trailer of claim 1 wherein said trailer has a generally planar deck.

4. The trailer of claim 1 wherein said channel is generally in the form of a U-shaped member.

5. The trailer of claim 4 further including a removable filler member positionable in said generally U-shaped member.

6. The trailer of claim 1 wherein said trailer is provided with side walls.

7. The trailer of claim 1 wherein said trailer frame is provided with a tow bar.

8. The trailer of claim 7 wherein said trailer frame includes spaced-apart receptacles and wherein said tow bar has generally parallel frame members detachably securable in said receptacles.

9. The trailer of claim 1 further including fail safe means having:

(a) stop means on one of said axles;

(b) a locking bar on said frame with first and second positions, said locking bar in said first position being engageable with said stop means and in second position being clear of said stop means whereby in said first position, said stop means will engage said locking means at a predetermined lowered position to prevent further lowering of the trailer.

10. The trailer of claim 9 further including control means for selectively placing said locking bar in said first or second position.

11. The trailer of claim 10 wherein said control means includes a handle remotely located from said locking bar and cable means interconnecting said handle to said control means.

12. The trailer of claim 1 wherein said air relief valve comprises a Schrader valve.

13. A two-wheeled trailer having a travel and a lowered position comprising:

(a) a frame having a width and including:

i. a generally longitudinally extending centrally positioned channel having a width less than the width of the frame;

ii. a lateral support secured to said channel, said lateral support having a main body section and having opposite end sections laterally spaced from said channel each defining a suspension surface spaced laterally above said main body section;

(b) first and second axles being pivotally connected to said lateral support adjacent and laterally spaced from said longitudinal channel and each axle extending outward to an axle end spaced below said suspension surface end section of the associated lateral support;

(c) first and second ground-engaging wheel assemblies on the ends of said first and second axles;

(d) an air spring interposed at each of the axle ends extending between the associated axle and the associated suspension surface of said lateral support, each air spring having a deflated position in which said associated axle is angularly inclined;

(e) a pneumatic system for selectively inflating and deflating said air springs to maintain the trailer substantially level during travel and lowering the channel close to the ground for loading and unloading, said pneumatic system including:

i. a source of air supply;

ii. a control valve having a body having a passageway with an outlet and an inlet, said inlet being in communication with said air supply;

iii. a level control valve for each spring mounted to the frame, each said level control valve having an inlet in communication with said outlet from said control valve and having a first neutral position, a second venting position and a third position for directing air to the associated air spring; and iv. actuator means associated with said level control valves engaging said axle moveable to selectively position the associated said level valve in said first, second or third position;

(f) said control valve further including:

i. valve means within said passageway moveable between first and second positions, said valve means including operator means for moving said valve means between said first and second positions;

ii. said valve means in said first position directing a flow of air to said level control valves; and iii. an air release valve communicating with each of said air springs and cam means positionable by said operator means to place said air release valve in a venting position when said operator means is moved to said second position;

(g) stop means on one of said axles; and (h) a locking bar on said frame with first and second position, said locking bar in said first position being engageable with said stop means and in second position being clear of stop means whereby in said first position, said stop means will engage said locking means at a predetermined lowered position to prevent further lowering of the trailer.

14. The trailer of claim 13 wherein said lateral support comprises steel plates forming a general U-shaped channel having spaced-apart side walls.

15. The trailer of claim 14 wherein said axles are pivotally connected to said lateral supports at bushings extending between said walls.

* * * * *